June 19, 1923.  E. M. SOUVIELLE  1,459,452
THRUST BEARING
Filed Jan. 25, 1922
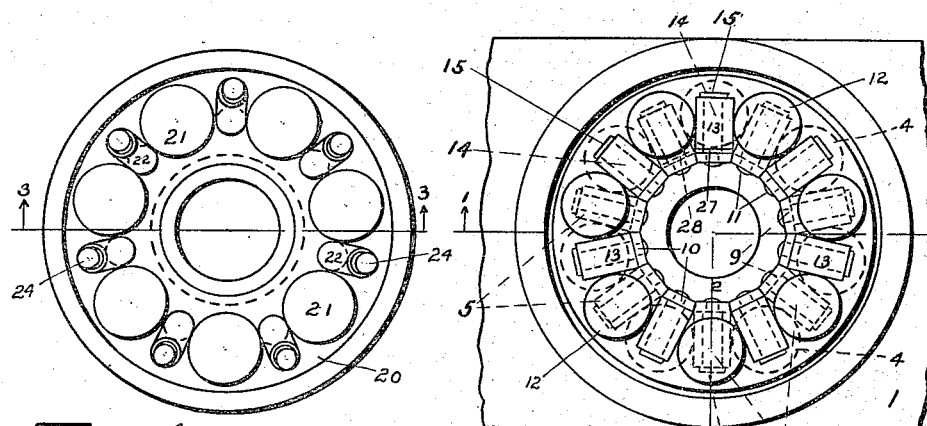
Fig 2
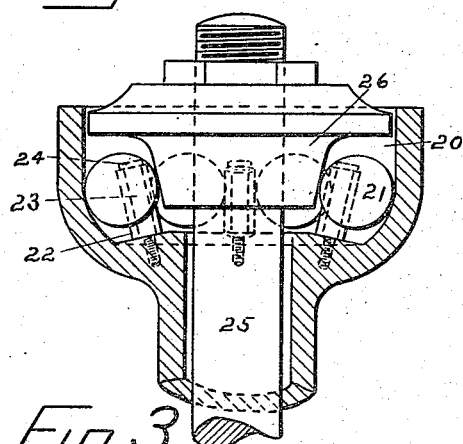
Fig 4
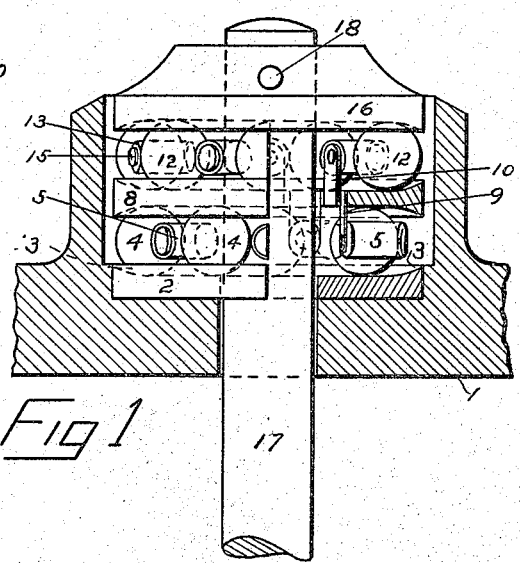
Fig 3
Fig 1
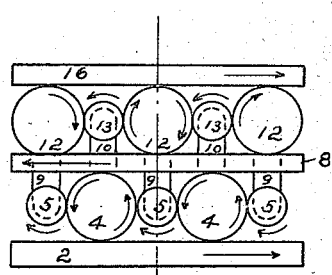
Fig 5
Elisa M. Souvielle,
Inventor,
by Henrik J. Schmidt,
her Attorney.

Patented June 19, 1923.

1,459,452

UNITED STATES PATENT OFFICE.

ELISA M. SOUVIELLE, OF JACKSONVILLE, FLORIDA.

THRUST BEARING.

Application filed January 25, 1922. Serial No. 531,522.

*To all whom it may concern:*

Be it known that I, ELISA M. SOUVIELLE, a citizen of the United States, residing at Jacksonville, in the county of Duval and State of Florida, have invented certain new and useful Improvements in Thrust Bearings, of which the following is a specification.

My invention relates to both thrust and radial bearing. The main and particular objects and advantages of the invention are, to provide a bearing, in which the friction is reduced to the least possible amount, in which all moving parts roll or move in such a manner as to meet no opposition from the part or parts adjacent, and to have the various parts made of ferrous and non-ferrous metals so that only unlike metals are in contact.

Another object is to provide a thrust bearing which can be used either at the top or bottom of a vertical shaft, as well as on a horizontal shaft. A further object is to provide a bearing simple in construction and comparatively inexpensive to manufacture.

These and various other objects and advantages will be clearly understood from the following description and the accompanying drawing on which:

Fig. 1 is a side elevation of a thrust bearing, partially shown in cross-section as indicated by line 1—1 in Fig. 2.

Fig. 2 is a plan view of Fig. 1. The shaft and upper ball race having been removed.

Fig. 3 is a side view of a radial bearing, partially shown in cross-section as indicated by line 3—3 on Fig. 4.

Fig. 4 is a plan view of Fig. 3. The shaft and cone having been removed.

Fig. 5 is a distorted diagram showing the direction of rotation of the various members in Fig. 1.

Referring first to the thrust bearing shown at Fig. 1 and Fig. 2, 1 is the housing, 2 a race ring or disc; this disc is secured in the housing by fitting in a recess, as shown. The race ring 2 is slightly cupped on its upper face as plainly shown at 3.

On the cupped face 3 a plurality of balls 4 are placed, between these balls rollers 5 are interposed. These rollers are rotatingly mounted on studs 6, having heads 7 to keep the rollers in place. A double race ring or disc 8 is placed on the balls 4. This race ring has two cupped faces, similar to the cupped face 3 on disc 2. The disc 8 has a plurality of stud supports 9 and 10 formed at its inner edge; these stud supports are bent alternately upwards and downwards and correspond in numbers to the number of rollers employed.

To the downward bent stud support 9 the stud 6 is riveted, this is accomplished by turning down a shoulder on the stud and passing this turned down portion through a hole in the stud support. This is plainly shown at 11. On the upper face of disc 8 additional balls 12 are placed and here again rollers 13 are interposed between the balls. These rollers are supported similarly to the rollers 5 and have studs 14, with heads 15, riveted in the upward bent stud supports 10.

On the balls 12 the upper race ring or disc 16 is placed. This disc has its lower face cupped and is rigidly attached to the shaft 17, in this case by means of a pin 18, but any other attaching means may be employed. It will be noted that the balls 4 and rollers 5 are staggered in relation to balls 12 and rollers 13. It will also be noted that while Fig. 1 shows a shaft supported at its upper end, a slight modification of the parts would adapt it for supporting the shaft at its lower end.

The principle involved in the radial bearing, shown at Fig. 3 and Fig. 4, is similar to the principle involved in the thrust bearing just described.

Referring now to Fig. 3 and Fig. 4, 20 is the ball race, 21 the balls and 22 the rollers. In this case the rollers are rotatingly mounted on studs 23 which are attached directly to the ball race, by being screwed into same, but any other suitable fastening means might be used. Heads 24 are provided on the studs to keep the rollers in place. 25 is the shaft and 26 the ordinary cone employed in this class of bearings.

The diagram Fig. 5 shows plainly how, by the use of the rollers 5 and 13, the various members all turn or move in unison or with no opposition to one another. When it is desired to avoid contact between two ferrous metals, a small washer is placed between the rollers 5 and 13 and the stud supports 9 and 10, as shown at 27 and 28 respectively. Now, if parts 2, 5, 8, 13 and 16 are made of ferrous metal and the parts 4, 6, 27, 12, 14 and 28 are made of non-ferrous metal, only unlike metals will be in contact.

While I have shown preferred embodiments of my invention in the accompanying drawing, I do not wish to limit myself to the exact forms, constructions or arrangements of parts shown, as modifications might be made without departing from the scope of the invention.

Having thus described my invention, what I claim as new and desire to secure by Letters Patent is:

1. In a thrust bearing of the class described; a plurality of ball races; a plurality of balls operating in said ball races; a plurality of rollers interposed between the balls; a plurality of studs upon which the rollers rotate; a plurality of supports, formed on one or more of the ball races, extending alternately to opposite sides; and the studs secured to these supports.

2. In a thrust bearing of the class described; a plurality of ferrous metal ball races; non-ferrous metal balls operating between these ball races; a plurality of ferrous metal rollers interposed between the balls; a plurality of non-ferrous metal studs upon which the rollers rotate; a plurality of supports, formed on one or more of the ball races, extending alternately to opposite sides; the studs secured to these supports; and non-ferrous metal washers placed on the studs between the rollers and the supports.

In testimony whereof, I, ELISA M. SOUVIELLE, have signed my name to this specification in the presence of two subscribing witnesses, this 20th day of January, 1922.

ELISA M. SOUVIELLE.

Witnesses:
C. P. CAWLEY,
M. M. HOGAN.